Patented Aug. 15, 1939

2,169,618

UNITED STATES PATENT OFFICE 2,169,618

PRESERVATION OF RUBBER

Robert L. Sibley, Nitro, W. Va., assignor, by mesne assignments, to Monsanto Chemical Company, St. Louis, Mo., a corporation of Delaware No Drawing. Application January 20, 1936, Serial No. 59,929

10 Claims. (Cl. 18—50)

The present invention relates to the art of rubber manufacture, and particularly relates to the preparation of rubber compounds which resist deterioration due to the effects of heat and/or oxygen. It has long been known that such deterioration can be retarded to a certain degree by treating the rubber either before or after vulcanization with certain substances known as age-resisters or antioxidants. One object of the invention is to provide a superior class of antioxidants for rubber. A further object of this invention is to provide a class of materials which, when incorporated into rubber, preferably before the vulcanization thereof, imparts thereto properties markedly resistant to tear and cracking when portions thereof have been repeatedly and alternately stretched and the tension removed. Such a process is analogous to the flexing of an automobile tire in actual service.

The age resisting characteristics of a vulcanized rubber product can be readily ascertained by subjecting portions of the vulcanized product in a bomb to the action of 300 pounds of oxygen per square inch at a temperature of 70° C. The aged rubber samples are then examined and tested and the test data compared with the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending on the test.

The flex cracking resistance of the vulcanized rubber products may be determined on a flexing machine as set forth by L. V. Cooper, Analytical Edition of Industrial and Engineering Chemistry, vol. 2, No. 4, 1930, pages 391–394.

This invention comprises treating rubber with a product obtainable by reacting a secondary aromatic amine with an aliphatic acid, and preferably a low molecular weight aliphatic acid, as for example, formic and oxalic acid. As examples of secondary aromatic amines which are reactive with aliphatic acids, as for example acetic and formic acids, to produce the preferred class of rubber antioxidants are diphenyl amine, ditolyl amine, phenyl alpha naphthylamine, phenyl beta naphthyl amine, di-(biphenyl)-amine, diphenyl p-phenylene diamine, diphenyl m-phenylene diamine, ditolyl p-phenylene diamine, di-alpha naphthyl p-phenylene diamine, di beta naphthyl p-phenylene diamine and analogues and equivalents thereof.

As one specific embodiment of the invention, which is understood in no sense as limiting the scope thereof, substantially 100 parts by weight of diphenylamine and substantially 40 parts by weight of 90% formic acid were heated in a suitable reactor on a steam bath for about 12 hours. After removal of the unreacted diphenylamine and formic acid from the reaction product so obtained, the resulting material comprised a solid melting at substantially 73–74° C. The product so obtained, believed to possess the structure of

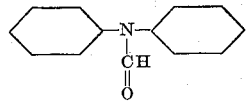

was incorporated in the well-known manner in a rubber tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl thio benzoate | 0.8 |
| Diphenyl guanidine | 0.2 |
| Reaction product of diphenyl amine and formic acid | 1.0 |

The rubber stock so compounded was vulcanized by heating in a press for 75, 90 and 105 minutes at 30 pounds steam pressure per square inch and the vulcanized rubber product aged for 96 hours in an oxygen bomb under a pressure of 300 pounds of oxygen per square inch and at a temperature of 70° C. The aged cured rubber product on testing was found to possess desirable aging characteristics.

More specifically, the present invention comprises the use of reaction products of diaryl phenylene diamines and an aliphatic acid as for example oxalic or formic acid as preventers of deterioration and flexing agents in rubber products.

As a further specific example of the present invention substantially 0.1 mol. (26 parts by weight) of diphenyl-p-phenylene diamine and substantially 0.1 mol (9 parts by weight) of oxalic acid were heated together for a convenient time at a temperature of substantially 150° C. The product so obtained comprised a solid melting at substantially 125–133° C. The product may be assigned the probable formula of

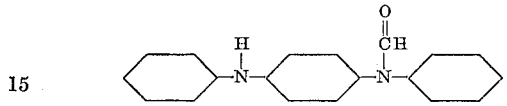

The material prepared as described was milled in the usual manner in a typical tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl thiobenzoate | 0.8 |
| Diphenyl guanidine | 0.2 |
| Reaction product of substantially equimolecular proportions of diphenyl-p-phenylene diamine and oxalic acid | 1.0 |

The stock so compounded was vulcanized and the vulcanized rubber aged in the oxygen bomb at a temperature of 70° C. and under a pressure of 300 pounds of oxygen per square inch with the following result:

Table I

| Cure | | Hours aged | Modulus of elasticity in lbs/in.² at elongations of— | | Tensile at break in lbs/in.² | Ultimate elongation, percent |
|---|---|---|---|---|---|---|
| Minutes | Pounds steam pressure | | 200% | 400% | | |
| 60 | 30 | 0 | 1075 | 2845 | 4425 | 555 |
| 60 | 30 | 96 | 1263 | 2515 | 2870 | 450 |
| 75 | 30 | 0 | 1170 | 3035 | 4435 | 520 |
| 75 | 30 | 96 | 1330 | 2540 | 2615 | 405 |
| 90 | 30 | 0 | 1225 | 3065 | 4325 | 520 |
| 90 | 30 | 96 | 1400 | -------- | 2560 | 395 |

An examination of the data given in Table I shows the preferred class of compounds, for example the reaction product of diphenyl-p-phenylene diamine and oxalic acid, possesses exceptional aging properties. Moreover, when portions of the unaged rubber stocks were flexed in the manner hereinbefore set forth, the stocks containing the preferred class of materials, for example, the reaction product of oxalic acid and diphenyl-p-phenylene diamine, were found by test to possess exceptionally good flexing properties. Portions of the above unaged vulcanized rubber stocks were artificially aged in the Geer oven for 3 days at a temperature of 70° C. and then flexed in the manner described above. Here, even after this drastic treatment, the aged rubber stocks possessed exceptionally good flexing properties.

Diphenyl-p-phenylene diamine exhibits poor solubility in rubber stocks, and "blooms" or migrates to the surface of the vulcanized rubber product within a few hours after vulcanization. This undesirable property renders it undesirable for commercial application. The preferred class of materials, for example, the reaction product of diphenyl-p-phenylene diamine and oxalic acid showed a decided improvement thereover as to this undesirable property.

As a further specific embodiment of the present invention diaryl p-phenylene diamine, for example diphenyl-p-phenylene diamine has been reacted with oxalic acid by heating said reactants together for a convenient period of time at a temperature of substantially 120° to 125° C. in the ratio of substantially one molecular proportion of the former to substantially two molecular proportions of the latter. The product so obtained comprising a solid melting at substantially 135° C. was incorporated in a rubber tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl thiobenzoate | 0.8 |
| Diphenyl guanidine | 0.2 |
| Reaction product of substantially one molecular proportion of diphenyl-p-phenylene diamine and substantially two molecular proportions of oxalic acid | 1.0 |

The rubber stocks so compounded were vulcanized and the cured rubber products aged in the oxygen bomb at a temperature of 70° C. and under a pressure of 300 pounds of oxygen per square inch, and the results obtained as given in Table II.

Table II

| Cure | | Hours aged | Modulus of elasticity in lbs/in.² at elongations of— | | Tensile at break in lbs/in.² | Ultimate elongation, percent |
|---|---|---|---|---|---|---|
| Minutes | Pounds steam pressure | | 200% | 400% | | |
| 60 | 30 | 0 | 1075 | 2880 | 4135 | 540 |
| 60 | 30 | 96 | 1215 | 2475 | 2585 | 435 |
| 75 | 30 | 0 | 1145 | 3090 | 4075 | 510 |
| 75 | 30 | 96 | 1230 | 2510 | 2510 | 400 |
| 90 | 30 | 0 | 1180 | 3145 | 4025 | 510 |
| 90 | 30 | 96 | 1320 | -------- | 2280 | 350 |

From the data set forth in Table II it is shown that the preferred class of materials, for example, the reaction product of substantially one molecular proportion of diphenyl-p-phenylene diamine and substantially two molecular proportions of oxalic acid, possess exceptionally good aging properties. Flexing tests carried out in the manner described above on the unaged vulcanized rubber product and on the vulcanized rubber product aged for 3 days in the Geer oven at a temperature of 70° C. showed the rubber products to be markedly resistant to flex cracking. Furthermore, the vulcanized rubber product showed no "bloom" or migration to the surface of the stock after fifteen days, thus exhibiting a marked improvement in this respect over the use of diphenyl-p-phenylene diamine itself.

The antioxidants of the present invention may conveniently be employed with other materials possessing antioxidant properties. Thus, the reaction product of substantially equimolecular proportions of diphenyl-p-phenylene diamine and oxalic acid has been advantageously employed in conjunction with diphenyl-p-phenylene diamine itself and with the hydrochloric acid treated 2,2,4-trimethyl-dihydro-quinoline as disclosed in pending application Serial No. 715,157 filed March 12, 1934.

As a further specific embodiment of the invention substantially 0.1 mol (26 parts by weight) of diphenyl-p-phenylene diamine and a 50% excess over 0.2 mol (20 parts by weight) of 70% formic acid were heated together in the presence of a suitable solvent, for example benzene, at refluxing temperature for substantially one to two hours. The product so formed was washed with water and the solvent removed from the washed product. The material so obtained was incorporated in a rubber tread stock comprising

|  | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl thiobenzoate | 0.8 |
| Diphenyl guanidine | 0.2 |
| Reaction product of diphenyl-p-phenylene diamine and formic acid as described above | 1.0 |

The rubber stocks so compounded were vulcanized and the cured rubber product aged in the oxygen bomb at a temperature of 70° C. and under a pressure of 300 pounds of oxygen per square inch, and the results obtained as given in Table II.

*Table III*

| Cure | | Hours aged | Modulus of elasticity in lbs/in.$^2$ at elongations of— | | Tensile at break in lbs/in.$^2$ | Ultimate elongation, percent |
|---|---|---|---|---|---|---|
| Minutes | Pounds steam pressure | | 200% | 400% | | |
| 60 | 30 | 0 | 1185 | 2980 | 4130 | 540 |
| 60 | 30 | 96 | 1140 | 2325 | 2345 | 400 |
| 75 | 30 | 0 | 1305 | 3205 | 4080 | 510 |
| 75 | 30 | 96 | 1210 | ------ | 2295 | 385 |
| 90 | 30 | 0 | 1260 | 3145 | 4160 | 520 |
| 90 | 30 | 96 | 1245 | ------ | 2250 | 375 |

Flexing tests carried out in the manner described above showed that the reaction product of diphenyl-p-phenylene diamine and formic acid exhibited the flexing properties typical of the preferred class of antioxidants.

From the specific examples hereinbefore set forth, it is shown that rubber compositions containing small proportions of the preferred class of materials markedly resist the deterioration influences due to heat, oxidation and flexing.

Obviously, practice of the present invention is not limited to the specific compositions given above, such compositions being merely illustrative of the manner of employing the antioxidants or age-resisters of this invention. The antioxidants or age-resisters may be employed in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than the ones specifically shown with varying differences in tensile and modulus properties but still exhibiting the desirable qualities of the class.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments or accelerating agents.

The present invention is limited solely by the claims attached hereto as part of the present specification.

What is claimed is:

1. The method of preserving rubber which comprises treating rubber with a compound possessing the structural formula of

wherein R is an aromatic radical and R' is hydrogen or an alkyl radical.

2. A composition comprising rubber and a compound possessing the structural formula of

wherein R is an aromatic radical and R' is hydrogen or an alkyl radical.

3. The method of preserving rubber which comprises treating rubber with an N,N' diaryl phenylene diamine containing an aliphatic acyl radical attached to at least one of said nitrogen atoms.

4. The method of preserving rubber which comprises treating rubber with an N,N' diphenyl phenylene diamine containing an aliphatic acyl radical attached to at least one of said nitrogen atoms.

5. The method of preserving rubber which comprises treating rubber with N,N' diphenyl p-phenylene diamine containing the formyl radical attached to only one of said nitrogen atoms.

6. The method of preserving rubber which comprises treating rubber with N,N' diphenyl p-phenylene diamine containing the formyl radical attached to each of said nitrogen atoms.

7. A composition comprising rubber and an N,N' diaryl phenylene diamine containing an aliphatic acyl radical attached to at least one of said nitrogen atoms.

8. A composition comprising rubber and an N,N' diphenyl phenylene diamine containing an aliphatic acyl radical attached to at least one of said nitrogen atoms.

9. A composition comprising rubber and N,N' diphenyl p-phenylene diamine containing the formyl radical attached to only one of said nitrogen atoms.

10. A composition comprising rubber and N,N' diphenyl p-phenylene diamine containing the formyl radical attached to each of said nitrogen atoms.

ROBERT L. SIBLEY.